(No Model.) 4 Sheets—Sheet 3.
G. G. HUNT.
MOWING MACHINE.
No. 366,003. Patented July 5, 1887.
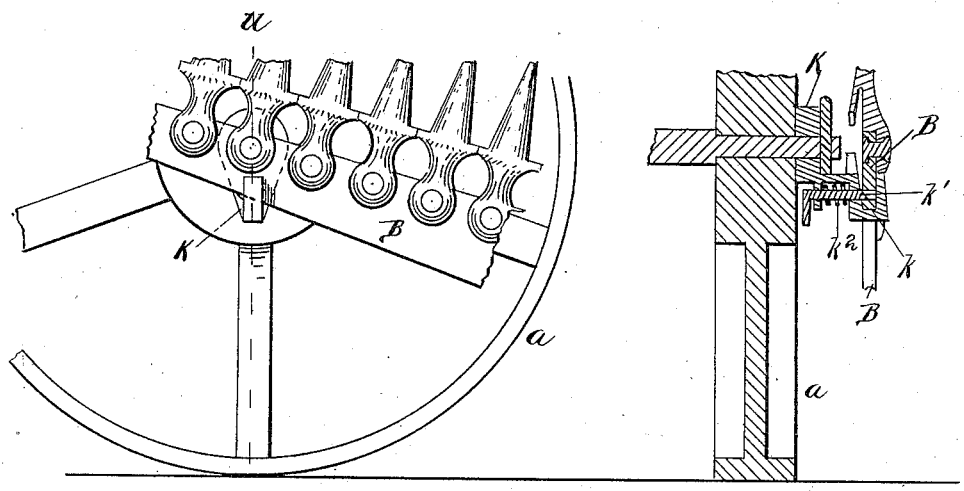
Fig. 9.  Fig. 10.
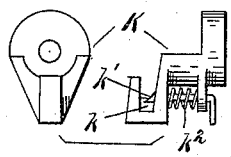
Fig. 11.
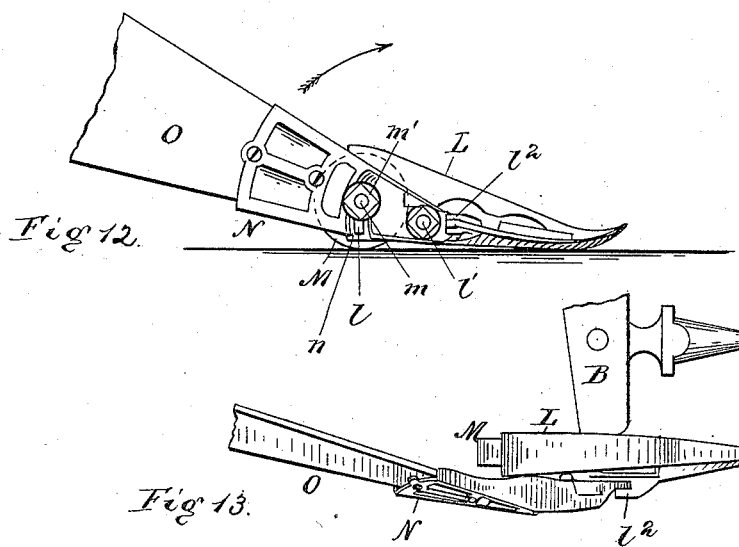
Fig. 12.
Fig. 13.
Witnesses
W. C. Corliss
P. E. Rennerd
Inventor
George G. Hunt
By Cadburn & Thacher
Attorneys (No Model.)  4 Sheets—Sheet 4.

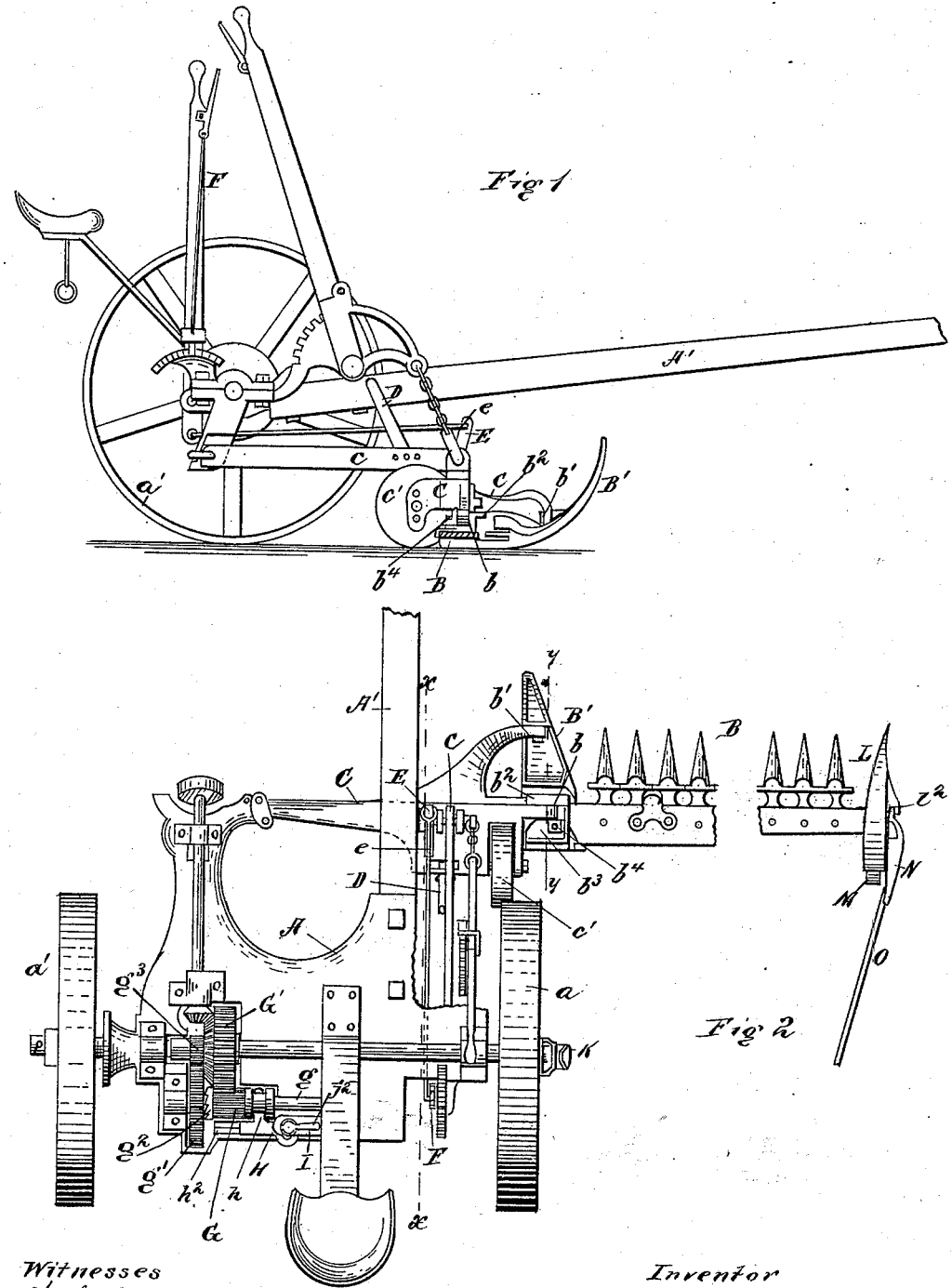

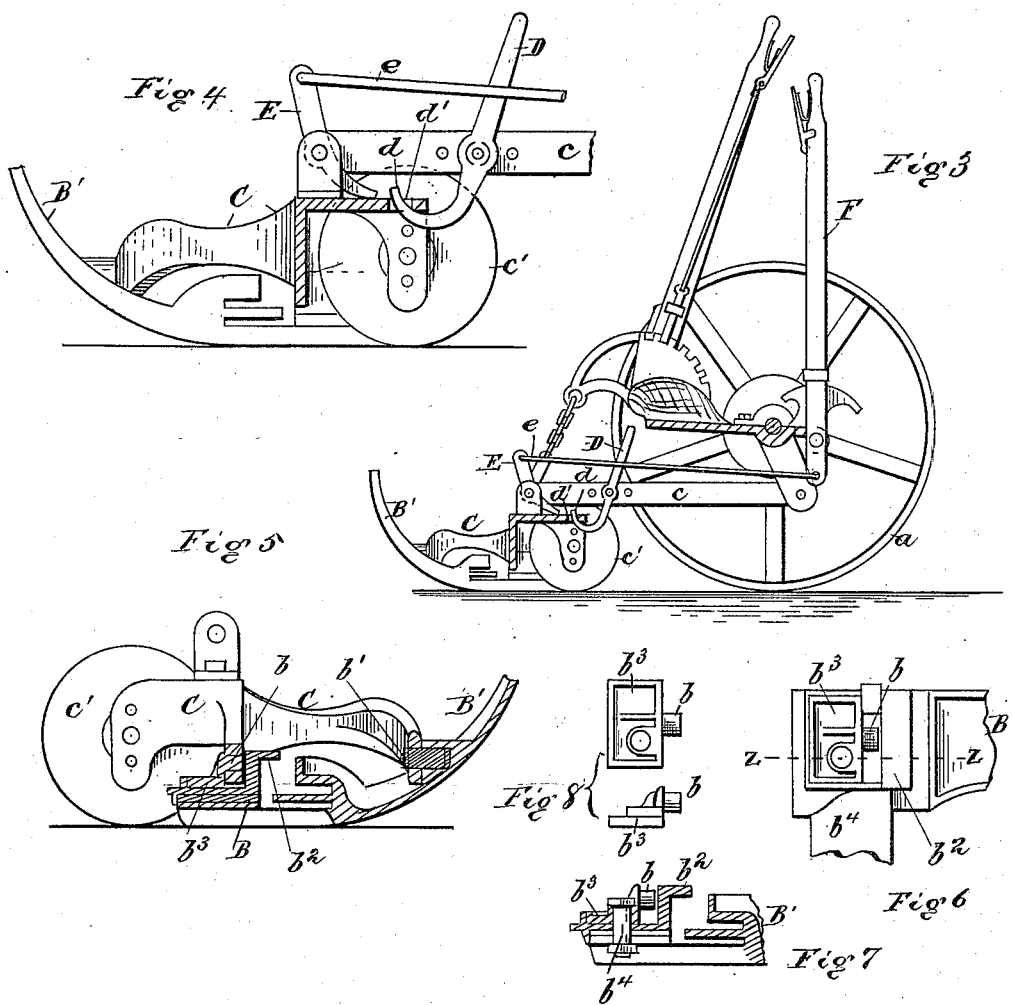

G. G. HUNT.
MOWING MACHINE.

No. 366,003.  Patented July 5, 1887.

Witnesses.
W. C. Corlies
Irvine Miller

Inventor
George G. Hunt
By Coburn & Thacher
Attorneys

N. PETERS, Photo-Lithographer, Washington, D. C.

UNITED STATES PATENT OFFICE.

GEORGE G. HUNT, OF BRISTOL, ASSIGNOR OF ONE-HALF TO THE PLANO MANUFACTURING COMPANY, OF PLANO, ILLINOIS.

MOWING-MACHINE.

SPECIFICATION forming part of Letters Patent No. 366,003, dated July 5, 1887.

Application filed August 11, 1884. Serial No. 140,276. (No model.)

*To all whom it may concern:*

Be it known that I, GEORGE G. HUNT, a citizen of the United States, residing at Bristol, in the county of Kendall and State of Illinois, have invented certain new and useful Improvements in Mowing-Machines, which are fully set forth in the following specification, reference being had to the accompanying drawings, in which—

Figure 14:
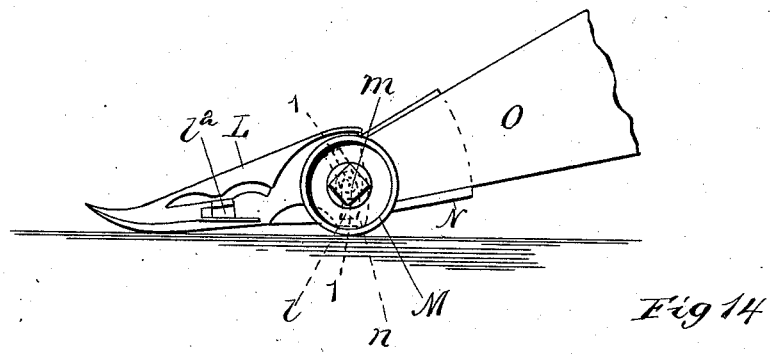
Figure 15:
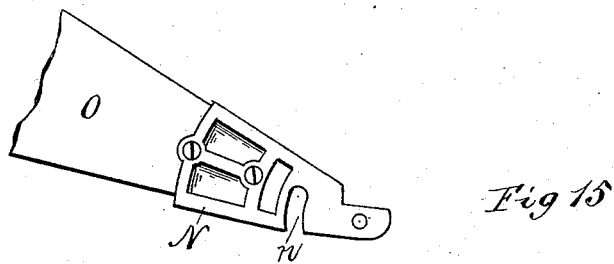

Figure 1 represents a side elevation of a mowing-machine embodying my improvements, with the inner supporting-wheel removed and the cutting apparatus shown in section; Fig. 2, a plan view of the same; Fig. 3, a transverse section of the same taken on the line $x\ x$, Fig. 2; Fig. 4, a detail of the shoe portion of the section shown in Fig. 3, and on an enlarged scale; Fig. 5, a detail section taken on the line $y\ y$, Fig. 2; Fig. 6, a detail plan of the inner shoe and its attachments; Fig. 7, a sectional view of the same taken on the line $z\ z$, Fig. 6; Fig. 8, a plan and an elevation of the pivot-block detached from the shoe; Fig. 9, a detail elevation of the inner wheel and cutting apparatus turned up and secured in position for transportation; Fig. 10, a section of the same taken on the line $u\ u$, Fig. 9; Fig. 11, front and side elevations of the axle-bracket which supports the cutting apparatus for transportation; Fig. 12, a side elevation of the shoe and track-clearer; Fig. 13, a plan view of the same; Fig. 14, an inside elevation of the same; Fig. 15, an elevation of the track-clearer detached; and Fig. 16, a detail section taken on the line $1\ 1$, Fig. 14.

Figure 16:
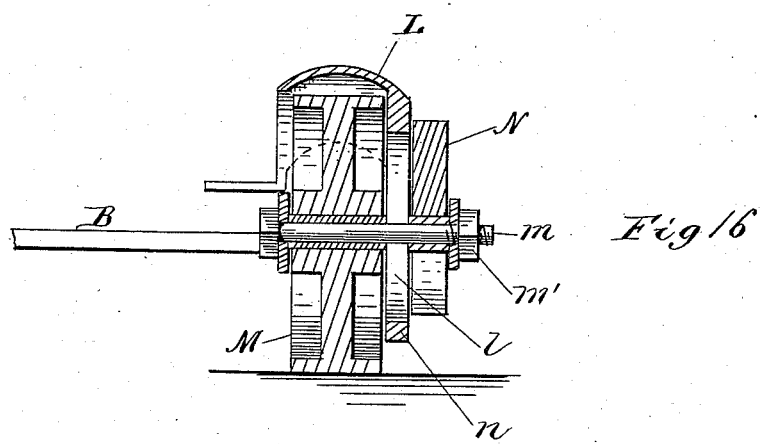

The figures of the drawings from 1 to 3, inclusive, are on the same scale, and the remaining figures from 4 to 15, inclusive, are on the same scale as compared with each other, but enlarged from the scale of the former, and Fig. 16 on a scale still further enlarged.

My invention relates to improvements in several parts of mowing-machines.

I will proceed to describe in detail a machine in which these several improvements are embodied, and will then point out definitely in the claims the special improvements which I believe to be new and wish to protect by Letters Patent.

All the main features of the machine may be of any ordinary construction; and I shall particularly describe only those parts which are necessary to an understanding of my present invention.

In the drawings, A represents the main frame of the machine; $a$, the inner, and $a'$ the outer, main or supporting wheels, and $A'$ the pole. The cutting apparatus B is connected to the main frame by means of a coupling-arm, C, and a hinged thrust-bar, $c$, the coupling-arm being attached to the frame by a universal joint, so as to permit the cutting apparatus to be tilted. The inner shoe, B', is hinged to the outer end of the coupling-arm by two pivot pins or lugs, $b\ b'$, the former at the rear and the latter at the front portion of the shoe, and the coupling-arm being forked at its outer end to receive the two pivot-pins. This is an ordinary construction; but heretofore the pivot $b$ has been cast on the cap-piece $b^2$, or some part of the main body of the shoe. A fracture at this joint therefore occasioned the loss of the entire piece. In order to obviate this difficulty, I cast a separate small block or plate, $b^3$, on which this pivot pin or lug is formed, and which is fitted to the top of the cap-piece and is secured in place by the usual bolt, $b^4$, which fastens the cap-piece, shoe, and finger-bar together. It will be seen from this description that if there is a fracture at this rear coupling-joint only a small piece will be lost.

A wheel, $c'$, is mounted in the coupling-arm at the rear portion thereof and near the inner shoe. In tilting the finger-beam the coupling-arm rocks on this wheel. A foot-lever, D, is pivoted to the hinged thrust-bar $c$, just in rear of the coupling-arm, and has its lower end bent into a kind of hook, $d$, which passes underneath the rear edge of the coupling-arm—which is widened at this portion—and enters a hole, $d'$, in the latter, and when in this position, as shown in Figs. 3 and 4 of the drawings, the coupling-arm will be locked against any rocking movement; but if it is desired to rock the arm so as to tilt the finger-beam the lever is disengaged by the foot, and the tilting is then accomplished by means of a lever, E, which is mounted in this instance on the hinge pin or bolt of the forward end of the thrust-bar. The lower end of the lever is bent backward somewhat, and rests on the rear portion of the coupling-arm. A rod, $e$, is connected to the upper end of the lever, and extends backward to the lower end of a hand-lever, F, to which it is attached. This hand-lever is mounted on the main frame of the machine within reach of the driver, and is provided with any ordinary device for securing it in any position to which it may be adjusted. Obviously, when this hand-lever is pushed forward the coupling-arm will be rocked so as to tilt up the finger-beam, and this may be done whenever occasion requires by releasing the lever D; or if the latter is held out of disengagement with the coupling-arm the finger-beam will be free to tilt upward without operating the tilting-lever in passing over the ordinary obstructions. The gear-pinion G, which drives the gear-wheel G', mounted loosely on the main axle, is arranged on a counter-shaft, $g$, and connected thereto so as to permit movement lengthwise for the purpose of engaging and disengaging with the gear-wheel $g'$, which is mounted loosely on the same counter-shaft. The pinion G is provided with a clutch, $g^2$, which is constructed to engage with a similar clutch on the gear-wheel $g'$. A pinion, $g^3$, fast on the main axle, drives the wheel $g'$, and the wheel G' has a bevel-gear on one face which engages with a bevel-pinion on the crank-shaft. I have devised an improved shipping mechanism for this gearing, but as it constitutes the subject-matter for a separate patent, and forms no part of my present invention, I shall not describe it here, though some parts thereof are shown in Fig. 2 of the drawings.

In moving along the road or from field to field the cutting apparatus is turned up on its joint with the coupling-arm, and is then turned back by the rocking of the latter and supported by the end of the axle alongside the inner wheel. To provide for this support I make a bracket, K, which is adapted to be mounted on the end of the axle next to the wheel, as shown in Fig. 10 of the drawings. This bracket is extended downward and outward, and its outer end is provided with a suitable seat or rest, $k$, for the rear edge of the finger-beam which drops into this seat when turned up and back, as described above. A spring-catch, $k'$, is arranged in suitable bearings on the under side of the bracket and inside of the seat for the finger-beam. As shown in the drawings, this catch is an ordinary sliding bolt-catch, and is provided with a spring, $k^2$, arranged between the bearings of the catch and holding the latter outward sufficiently to cause its outer or beveled end to project into the opening for the finger-beam. When the finger-beam is turned back upon this bracket, as it drops into the seat, the catch-bolt will be pushed back until the bar rests in its seat, when the bolt enters an aperture made for this purpose in the finger-bar, and the latter will be secured in place, as shown in Fig. 16 of the drawings, so as to obviate all danger of jumping from its seat as the machine is drawn over the ground. The inner end of the catch may be bent so as to facilitate the withdrawal of the catch from engagement with the finger-bar when it is desired to turn down the latter into working position.

I also provide for throwing the track-clearer up out of the way when the cutting apparatus is turned up for transportation, or for adjusting the height of the track-clearer when in working position. I accomplish this in the following way: The outer shoe, L, is of any usual construction in its main features, and is provided with the common small wheel M, the journal-pin $m$ of which is mounted in a slot, $l$, in the rear portion of the shoe, so as to provide for the vertical adjustment of the latter on the wheel. The pin is fastened in position by thimbles which are clamped against the sides of the bearing by a suitable nut or nuts, $m'$, on the end of the pin. The socket-frame N for the track-clearer O is cast of skeleton form, and is pivoted at its front end to the shoe in front of the wheel. This is effected by providing a short journal-pin, $l'$, on the outside of the shoe, which enters a suitable opening in the end of the socket-frame N, the extreme end of which latter passes inside of a short lip, $l^2$, on the shoe just in front of the journal, as shown in Fig. 13 of the drawings. The journal $l'$ is tubular, and the parts are fastened together by a short bolt and nut. A curved slot or recess, $n$, is made in the lower edge of the socket-frame and is adapted to fit over and receive the outer end of the journal-pin $m$ of the wheel M, which for this purpose is extended beyond the shoe and has a thimble on the outer end thereof, over which this recess $n$ passes. The fastening or clamping nut $m'$ of the journal-pin $m$ is outside of the socket-frame, and is turned up against the thimble in order to secure the journal-pin in place. The track-clearer is left free to rise and fall, however, the recess $n$ being sufficiently loose on the thimble to permit this movement; but the washer on the outside of the thimble holds the track-clearer frame from swinging outward, and so saves the side strain on the pivot of the track-clearer, which is considerable in actual use.

I have shown these improvements applied to a front-cut machine; but it is obvious that they are not restricted altogether in their application to a machine of this type. I have simply shown a front-cut mower, because this is the type of machine which I prefer, and to which I have actually applied these improvements for practical use.

I do not wish to be understood as limiting myself in all particulars to the precise details of construction which have been set forth above, for it is obvious that some modifications may be made in mechanical details without departing from the main features of my improvements.

Having thus described my invention, what I claim as new, and desire to secure by Letters Patent, is—

1. The independent block or plate $b^3$, provided with the pivot-pin $b$, in combination with cap-piece $b^2$, the coupling-arm C, and shoe B, substantially as and for the purposes set forth.

2. The rocking coupling-arm, in combination with the cutting apparatus connected thereto, the hinged thrust-bar, and the separate locking-lever D, independent of the tilting-lever, substantially as and for the purposes set forth.

3. The outer shoe, L, in combination with the socket-frame N for the track-clearer pivoted to the shoe and provided with a circular recess, $n$, in its lower edge, and the journal-pin $m$ of the shoe-wheel, passing through the recess $n$, provided with a clamping-nut, substantially as and for the purposes set forth.

4. The outer shoe, L, provided with a slot, $l$, in combination with the wheel M, journal-pin $m$, and track-clearer frame N, pivoted to the shoe and provided with the recess $n$ in its lower edge, passing over said journal-pin, substantially as and for the purposes set forth.

GEORGE G. HUNT.

Witnesses:
JOSEPH W. BLOOD,
W. C. CORLIES.